(12) United States Patent
Park et al.

(10) Patent No.: US 11,282,178 B2
(45) Date of Patent: Mar. 22, 2022

(54) ELECTRONIC DEVICE AND METHOD OF IDENTIFYING FALSE IMAGE OF OBJECT ATTRIBUTABLE TO REFLECTION IN INDOOR ENVIRONMENT THEREOF

(71) Applicant: Korea Advanced Institute of Science and Technology, Daejeon (KR)

(72) Inventors: Yong-Hwa Park, Daejeon (KR); Daehee Park, Daejeon (KR); Simeneh Semegne Gulelat, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 185 days.

(21) Appl. No.: 16/742,851

(22) Filed: Jan. 14, 2020

(65) Prior Publication Data

US 2021/0042903 A1    Feb. 11, 2021

(30) Foreign Application Priority Data

Aug. 5, 2019    (KR) .................... 10-2019-0094964
Dec. 18, 2019   (KR) .................... 10-2019-0169960

(51) Int. Cl.
  *G06K 9/00*     (2022.01)
  *G06T 7/00*     (2017.01)
  *G06T 7/55*     (2017.01)

(52) U.S. Cl.
  CPC .............. *G06T 7/0002* (2013.01); *G06T 7/55* (2017.01); *G06T 2207/10024* (2013.01);
  (Continued)

(58) Field of Classification Search
  CPC ................. G06T 7/0002; G06T 7/55; G06T 2207/10024; G06T 2207/10028; G06T 2207/10048; G06T 2207/20076
  (Continued)

(56) References Cited

U.S. PATENT DOCUMENTS 8,121,351 B2    2/2012  Katz et al.
9,571,757 B2 *  2/2017  Shin ..................... H04N 5/2258
(Continued)

FOREIGN PATENT DOCUMENTS

KR    2014-0141174 A    12/2014
KR    2017-0081808 A    7/2017

OTHER PUBLICATIONS

Suzuki, Toshitaka, and Tetsushi Oka. "Grasping of unknown objects on a planar surface using a single depth image." 2016 IEEE International Conference on Advanced Intelligent Mechatronics (AIM). IEEE, 2016. (Year: 2016).*

(Continued)

*Primary Examiner* — Jonathan S Lee
(74) *Attorney, Agent, or Firm* — BakerHostetler

(57) ABSTRACT

Disclosed herein are an electronic device and an operating method thereof. The electronic device is for identifying an interested false image attributable to reflection in an indoor environment, and may be configured to obtain a color image and a depth image, detect an interested area indicative of at least one object in the color image, detect at least one reference surface in the depth image, and compare an interested depth of the interested area, detected based on the depth image, with a reference depth of the reference surface and process the interested area.

16 Claims, 12 Drawing Sheets

(52) U.S. Cl.
CPC ............... *G06T 2207/10028* (2013.01); *G06T 2207/10048* (2013.01); *G06T 2207/20076* (2013.01)

(58) Field of Classification Search
USPC .......................................................... 382/100
See application file for complete search history.

(56) References Cited

U.S. PATENT DOCUMENTS

| | | |
|---|---|---|
| 2011/0069892 A1 | 3/2011 | Tsai et al. |
| 2011/0150271 A1 | 6/2011 | Lee et al. |
| 2017/0280068 A1* | 9/2017 | Shin ..................... H04N 5/2354 |

OTHER PUBLICATIONS

Silberman, Nathan, and Rob Fergus. "Indoor scene segmentation using a structured light sensor." 2011 IEEE international conference on computer vision workshops (ICCV workshops). IEEE, 2011. (Year: 2011).*

Lin, Jiaying, Guodong Wang, and Rynson WH Lau. "Progressive mirror detection." Proceedings of the IEEE/CVF Conference on Computer Vision and Pattern Recognition. 2020. (Year: 2020).*

Owen, David, and Ping-Lin Chang. "Detecting reflections by combining semantic and instance segmentation." arXiv preprint arXiv:1904.13273 (2019). (Year: 2019).*

Park, Daehee, and Yong-Hwa Park. "Identifying Reflected Images From Object Detector in Indoor Environment Utilizing Depth Information." IEEE Robotics and Automation Letters 6.2 (2020): 635-642. (Year: 2020).*

European Patent Application No. 20151284.5; Extended Search Report; dated Aug. 11, 2020; 11 pages.

Huang et al.; "Glass detection and recognition based on the fusion of ultrasonic sensor and RGB-D sensor for the visually impaired"; Target and Background Signatures IV; Oct. 2018; 9 pages.

Sun et al.; "Multi-Modal Reflection Removal Using Convolutional Neural Networks"; IEEE Signal Processing Letters; vol. 26; Jul. 2019; p. 1011-1015.

Mallick et al.; "Estimation of the orientation and distance of a mirror from Kinect depth data"; Fourth National Conf. on Computer Vision, Pattern Recognition, Image Processing and Graphics; Dec. 2013; 4 pages.

* cited by examiner (a)

(310)

(b)

(320)

ELECTRONIC DEVICE AND METHOD OF IDENTIFYING FALSE IMAGE OF OBJECT ATTRIBUTABLE TO REFLECTION IN INDOOR ENVIRONMENT THEREOF

CROSS REFERENCE TO RELATED APPLICATION

This application is based on and claims priority under 35 U.S.C. 119 to Korean Patent Application Nos. 10-2019-0094964, filed on Aug. 5, 2019, and 10-2019-0169960, filed on Dec. 18, 2019, in the Korean Intellectual Property Office, the disclosures of which is herein incorporated by reference in their entireties.

BACKGROUND OF THE INVENTION

1. Technical Field

Various embodiments relate to an electronic device and a method of identifying a false image of an object attributable to reflection in an indoor environment thereof.

2. Description of the Related Art

In general, an electronic device has various functions and performs a complex function. In particular, the electronic device recognizes a specific object, for example, a person and performs a function for a person. For example, a service robot is implemented to detect and track the human body in order to provide a person with a specific service. To this end, the electronic device detects the human body in an image captured in real time. In this case, the electronic device detects the human body based on a two-dimensional (2D) color image. Accordingly, the electronic device detects a false image, reflected in a mirror or displayed on TV, as the human body in addition to an actual human body. This results in an operational error of the electronic device.

SUMMARY OF THE INVENTION

Various embodiments may provide an electronic device capable of clearly identifying an actual object and a false image attributable to reflection from a captured image and an operating method thereof.

Various embodiments may provide an electronic device capable of preventing an operational error which occurs because a false image attributable to reflection is detected as an actual object and an operating method thereof.

An operating method of an electronic device according to various embodiments may include obtaining a color image and a depth image, detecting an interested area indicative of at least one object in the color image, detecting at least one reference surface in the depth image, and comparing an interested depth of the interested area, detected based on the depth image, with a reference depth of the reference surface and processing the interested area.

An electronic device according to various embodiments may include a camera module and a processor connected to the camera module and configured to obtain a color image and a depth image through the camera module.

According to various embodiments, the processor may be configured to obtain a color image and a depth image, detect an interested area indicative of at least one object in the color image, detect at least one reference surface in the depth image, and compare an interested depth of the interested area, detected based on the depth image, with a reference depth of the reference surface and process the interested area.

A non-transitory computer-readable storage medium according to various embodiments may store one or more programs for obtaining a color image and a depth image, detecting an interested area indicative of at least one object in the color image, detecting at least one reference surface in the depth image, and comparing an interested depth of the interested area, detected based on the depth image, with a reference depth of the reference surface and processing the interested area.

DETAILED DESCRIPTION

Various embodiments of this document are described in detail with reference to the accompanying drawings.

Figure 1:
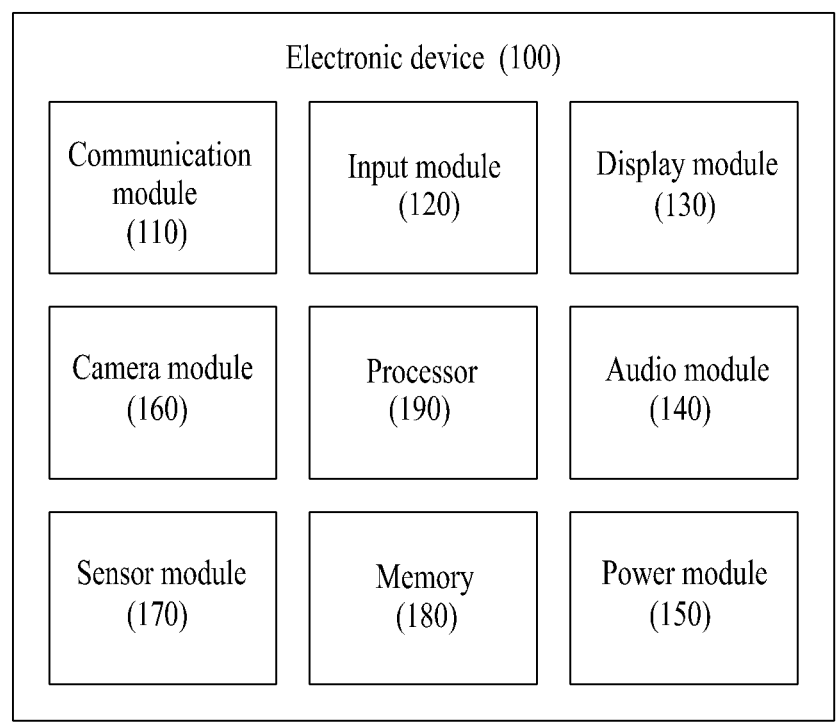
FIG. 1 is a diagram illustrating an electronic device according to various embodiments.
Figure 2:
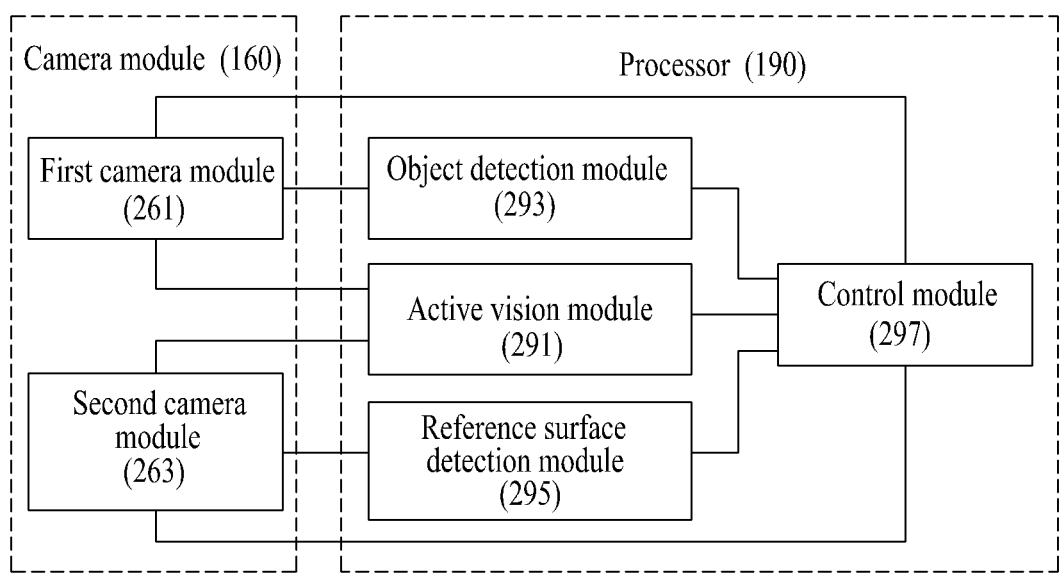
FIG. 2 is a diagram illustrating the camera module and processor of the electronic device according to an embodiment.

FIG. 1 is a diagram illustrating an electronic device 100 according to various embodiments. FIG. 2 is a diagram illustrating the camera module 160 and processor 190 of the electronic device 100 according to an embodiment. FIGS. 3, 4, and 5A to 5D are diagrams for describing an operation of the electronic device 100 according to various embodiments.

Referring to FIG. 1, the electronic device 100 according to various embodiments may include at least any one of a communication module 110, an input module 120, a display module 130, an audio module 140, a power module 150, a camera module 160, a sensor module 170, a memory 180, or a processor 190. In some embodiments, at least any one of the elements of the electronic device 100 may be omitted, and one or more other elements may be added to the electronic device 100.

The communication module 110 may support the communication of the electronic device 100 with an external device (not illustrated). The communication module 110 may support at least any one of wired communication or wireless communication with the external device. To this end, the communication module 110 may include at least any one of a wireless communication module or a wired communication module. For example, the wireless communication module may include at least any one of a cellular communication module, a short-distance wireless communication module, or a satellite communication module. For example, the external device may include at least any one of another electronic device or a server.

The input module 120 may receive an instruction or data to be used in at least any one of the elements of the electronic device 100 from the outside of the electronic device 100, for example, from a user. The input module 120 may include a microphone, a mouse or a key (or button).

The display module 130 visually may provide information to the outside of the electronic device 100. For example, the display module 130 may include at least any one of a display, a hologram device or a projector and a control circuit for controlling the display, hologram device or projector. According to one embodiment, the display module 130 may include a touch circuitry configured to detect a touch.

The audio module 140 may convert a sound into an electric signal or may convert an electric signal into a sound. The audio module 140 may obtain a sound through the input module 120. Alternatively, the audio module 140 may output a sound. For example, the audio module 140 may include at least any one of a speaker or a receiver.

The power module 150 may supply power to at least any one of the elements of the electronic device 100. For example, the power module 150 may include a battery. The battery may include at least any one of a non-rechargeable primary battery, a rechargeable battery or a fuel cell, for example.

The camera module 160 may capture an image, that is, a still image and a moving image. For example, the camera module 160 may include at least any one of one or more lens, image sensors, image signal processors or flashes. According to one embodiment, as shown in FIG. 2, the camera module 160 may include a first camera module 261 and a second camera module 263. As shown in FIG. 3(a), the first camera module 261 may capture a color image 310. For example, the first camera module 261 may be a visible light camera, and may generate the color image 310 based on an incident visible ray. As shown in FIG. 3(b), the second camera module 263 may capture a depth image 320. For example, the second camera module 263 may be an infrared camera, and may generate the depth image 320 based on an incident infrared ray. According to another embodiment, the camera module 160 may include a plurality of color pixels and a plurality of infrared pixels. The camera module 160 may generate the color image 310 based on a visible ray incident through the color pixels, and may generate the depth image 320 based on an infrared ray incident through the infrared pixels. In this case, the camera module 160 may generate the color image 310 based on an infrared ray incident through the infrared pixels along with a visible ray incident through the color pixels.

The sensor module 170 may detect an operating state of the electronic device 100 or an external environment state, and may generate an electric signal or data corresponding to a detected state. The sensor module 170 may include at least any one of at least one sensor, for example, a gesture sensor, a gyro sensor, an atmosphere sensor, a magnetic sensor, an acceleration sensor, a grip sensor, a color sensor, a humidity sensor, a temperature sensor, a proximity sensor or an illumination sensor.

The memory 180 may store various data used by at least any one of the elements of the electronic device 100. The data may include at least any one of at least one program and input data or output data related to the program, for example. For example, the memory 180 may include at least any one of a volatile memory or a non-volatile memory.

The processor 190 may control at least any one of the elements of the electronic device 100, and may perform various data processing or operations. To this end, the processor 190 may be connected to at least any one of the elements of the electronic device 100. The processor 190 may identify an object in an image obtained through the camera module 160. For example, the object may include the human body. According to one embodiment, as shown in FIG. 2, the processor 190 may include at least any one of an active vision module 291, an object detection module 293, a reference surface detection module 295 or a control module 297.

The processor 190 may obtain the color image 310 and the depth image 320 through the camera module 160. In this case, the color image 310 and the depth image 320 may be obtained in an indoor environment. To this end, the processor 190 may adjust the camera module 160. According to one embodiment, the active vision module 291 may actively adjust the location or posture of the camera module 160 or the optical system of the camera module 160.

Figure 4:
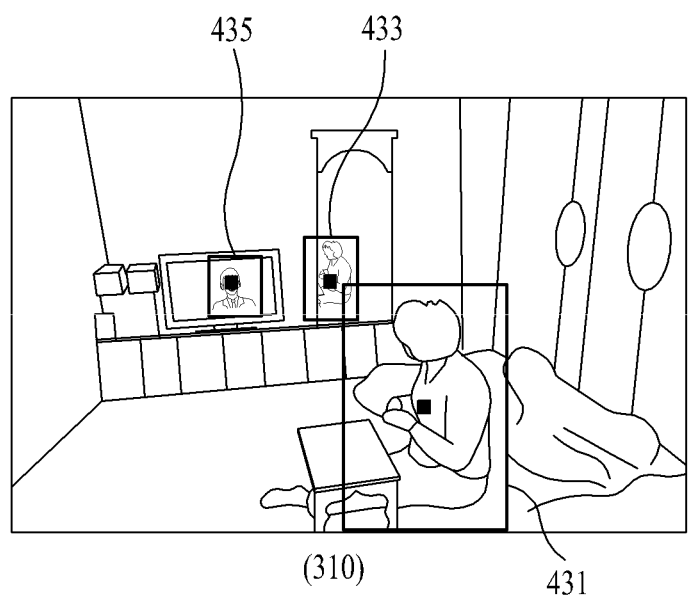

The processor 190 may detect an interested area 431, 433, 435 indicative of at least one object in the color image 310. For example, each of the interested areas 431, 433, and 435 may indicate at least some of an object. According to one embodiment, the object detection module 293 may detect the interested area 431, 433, 435 by analyzing the color image 310 based on object information. The object information may have been previously stored in the memory 180, and may indicate at least one of a skeleton, color or motion related to an object, for example. For example, as shown in FIG. 4, the object detection module 293 may detect the interested area 431, 433, 435 in the color image 310. Each of the interested areas 431, 433, and 435 may indicate any one of an actual object area 431, including an actual object, or an object false image area 433, 435 including a false image in which the object is reflected. In this case, the object false image area 433, 435 may include at least any one of a reflection object area 433, including a false image obtained when an object is reflected by a mirror, etc., or a display object area 435 including a false image obtained when an object is displayed as a screen or figure.

Figure 5A:
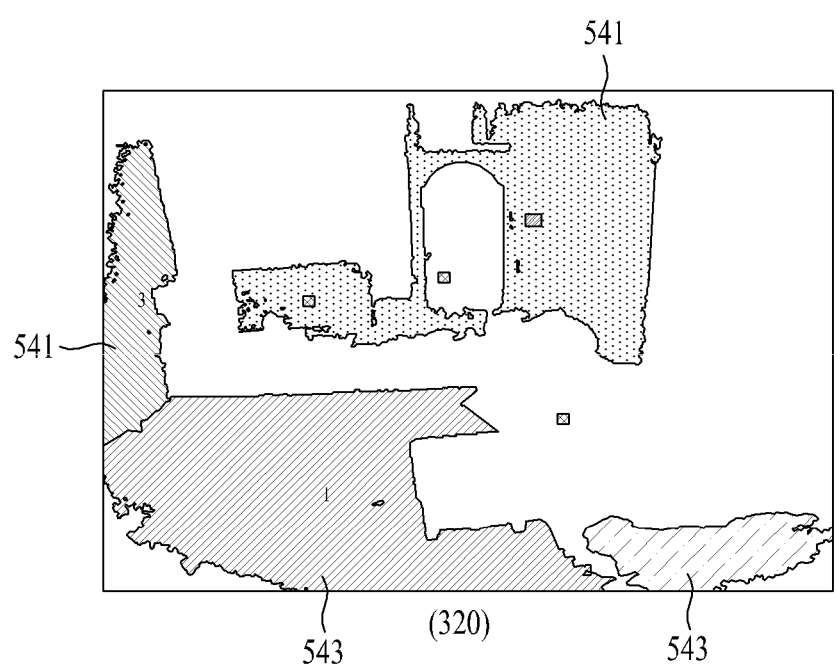

The processor 190 may detect at least one reference surface 541, 543 in the depth image 320. According to one embodiment, the reference surface detection module 295 may detect at least one plane as the reference surface 541, 543 in the depth image 320. For example, as shown in FIG. 5A, the reference surface detection module 295 may detect the reference surface 541, 543 in the depth image 320. In this case, the reference surface 541, 543 may include at least any one of the wall surface 541, bottom surface 543 or ceiling (not illustrated) of an indoor environment.

The processor 190 may compare an interested depth of the interested area 431, 433, 435 with a reference depth of the reference surface 541, 543, and may process the interested area 431, 433, 435. According to one embodiment, the control module 297 may control at least any one of the active vision module 291, the object detection module 293 or the reference surface detection module 295. Furthermore, the control module 297 may identify the interested depth of the interested area 431, 433, 435 with the reference depth of the reference surface 541, 543 based on the depth image 320. Accordingly, the control module 297 may identify each of the interested areas 431, 433, and 435 as any one of the actual object area 431 or the object false image area 433, 435 by comparing the interested depth with the reference depth, and may perform corresponding processing. For example, the control module 297 may neglect the object false image area 433, 435, and may execute a predetermined function in accordance with the actual object area 431.

For example, if an interested depth is less than a reference depth, the control module 297 may determine the interested area 431, 433, 435 as the actual object area 431. If the interested depth is the reference depth or more, the control module 297 may determine the interested area 431, 433, 435 as the object false image area 433, 435. In this case, if the interested depth exceeds the reference depth, the control module 297 may determine the interested area 431, 433, 435 as the reflection object area 433. If the interested depth is the same as the reference depth, the control module 297 may determine the interested area 431, 433, 435 as the display object area 435.

The electronic device 100 according to various embodiments may include the camera module 160, and the processor 190 connected to the camera module 160 and configured to obtain the color image 310 and the depth image 320 through the camera module 160.

According to various embodiments, the processor 190 may be configured to detect the interested area 431, 433, 435 indicative of at least one object in the color image 310, detect the at least one reference surface 541, 543 in the depth image 320, and process the interested area 431, 433, 435 by comparing the interested depth of the interested area 431, 433, 435, detected based on the depth image 320, with the reference depth of the reference surface 541, 543.

According to various embodiments, the processor 190 may be configured to determine that the interested area 431 includes an actual object if an interested depth is less than a reference depth and to determine that the interested area 433, 435 includes a false image in which an object is reflected if an interested depth is a reference depth or more.

According to various embodiments, the processor 190 may be configured to determine that the interested area 433 includes a false image in which an object is reflected by a mirror if an interested depth exceeds a reference depth and to determine that the interested area 435 includes a false image in which an object is displayed on the reference surface 541, 543 if the interested depth is the same as a reference depth.

According to various embodiments, the object may include the human body.

According to various embodiments, the processor 190 may be configured to neglect the interested area 433, 435 if it is determined that the interested area 433, 435 is included in a false image.

According to various embodiments, the reference surface 541, 543 may include at least any one of the wall surface 541, bottom surface 543 or ceiling (not illustrated) of an indoor environment.

According to one embodiment, the processor 190 may be configured to generate a point cloud by projecting the depth image 320 onto a three-dimensional (3D) space, detect at least one plane by clustering the points of the point cloud, and detect the reference surface 541, 543 in the plane.

According to another embodiment, the processor 190 may be configured to detect a pixel probability for each pixel from the depth image 320, generate a mask based on the pixel probability, detect at least one plane in depth pixels detected by multiplying the depth image 320 by the mask, and detect the reference surface 541, 543 in the plane.

According to various embodiments, the processor 190 may be configured to identify the interested depth of the interested area 431, 433, 435 by mapping the interested area 431, 433, 435 to the depth image 320 and to identify the reference depth of the reference surface 541, 543 in the depth image 320.

According to various embodiments, the processor 190 may be configured to calculate an intermediate value of depth values of pixels, corresponding to the interested area 431, 433, 435, as an interested depth and to calculate an intermediate value of depth values of pixels, corresponding to the reference surface 541, 543, as a reference depth.

According to various embodiments, the camera module 160 may include the first camera module 261 configured to capture the color image 310 and the second camera module 263 configured to capture the depth image 320.

According to various embodiments, the camera module 160 includes a plurality of color pixels and a plurality of infrared pixels. The color image 310 may be generated through color pixels. The depth image 320 may be generated through infrared pixels.

Figure 6:
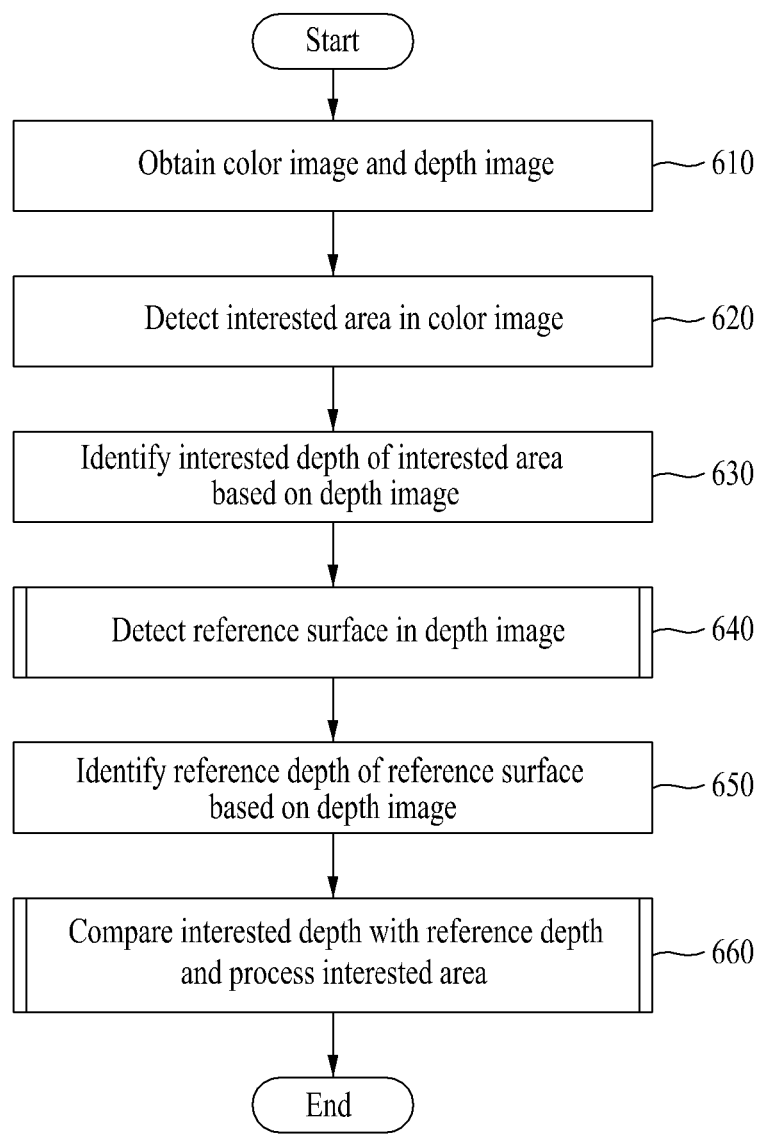
FIG. 6 is a diagram illustrating an operating method of the electronic device according to various embodiments.

FIG. 6 is a diagram illustrating an operating method of the electronic device 100 according to various embodiments.

Figure 3:
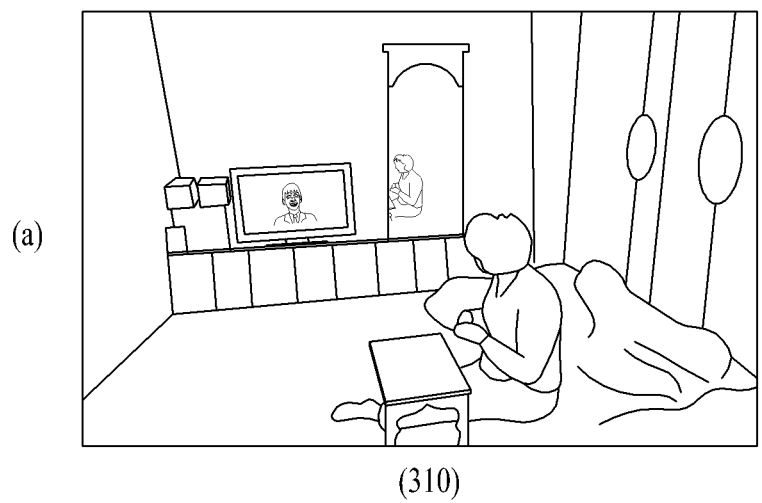
FIGS. 3, 4, and 5A to 5D are diagrams for describing an operation of the electronic device according to various embodiments.
Figure 3:
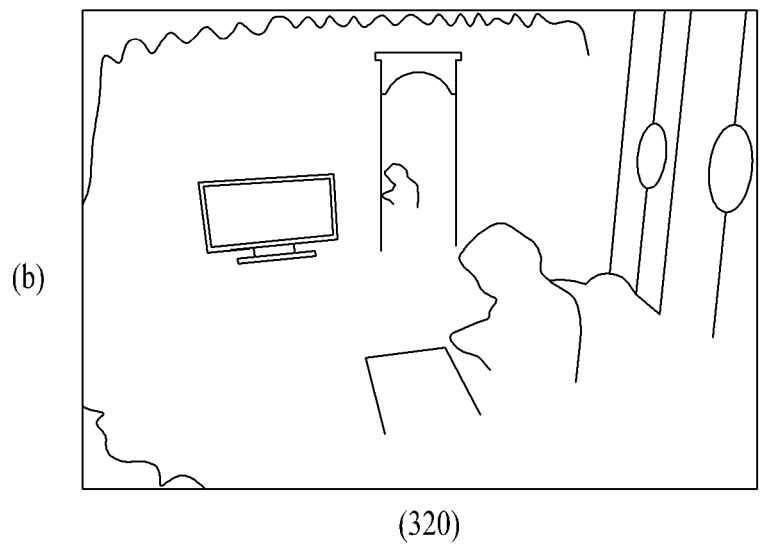

Referring to FIG. 6, at operation 610, the electronic device 100 may obtain the color image 310 and the depth image 320. The processor 190 may obtain the color image 310 and the depth image 320 through the camera module 160. In this case, the color image 310 and the depth image 320 may be obtained in an indoor environment. According to one embodiment, the processor 190 may obtain the color image 310 through the first camera module 261, and may obtain the depth image 320 through the second camera module 263. For example, the processor 190 may obtain the color image 310 as shown in FIG. 3(*a*), and may obtain the depth image 320 as shown in FIG. 3(*b*).

At operation 620, the electronic device 100 may detect at least one interested area 431, 433, 435 in the color image 310. The processor 190 may detect the interested area 431, 433, 435 indicative of at least one object in the color image 310. For example, the object may include the human body. According to one embodiment, the memory 180 previously stores object information. The processor 190 may detect the interested area 431, 433, 435 by analyzing the color image 310 based on the object information. The object information may indicate at least one of a skeleton, color or motion related to an object, for example. For example, the processor 190 may detect the interested area 431, 433, 435 in the color image 310 as shown in FIG. 4. Each of the interested areas 431, 433, and 435 may indicate any one of the actual object area 431, including an actual object, or the object false image area 433, 435 including a false image in which an object is reflected. In this case, the object false image area 433, 435 may include at least any one of the reflection object area 433 including a false image in which an object is reflected by a mirror, etc. or the display object area 435 including a false image generated because an object is displayed as a screen or figure.

At operation 630, the electronic device 100 may identify an interested depth of the interested area 431, 433, 435 based on the depth image 320. The processor 190 may identify the interested depth of the interested area 431, 433, 435 from the depth image 320 by mapping the interested area 431, 433, 435 to the depth image 320. According to one embodiment, the processor 190 may extract depth values of pixels, corresponding to each of the interested areas 431, 433, and 435, from the depth image 320, and may calculate an intermediate value of the depth values as a representative interested depth for each of the interested areas 431, 433, and 435.

At operation 640, the electronic device 100 may detect the at least one reference surface 541, 543 in the depth image 320. The processor 190 may detect at least one plane within the depth image 320 as the reference surface 541, 543. For example, as shown in FIG. 5*a*, the processor 190 may detect the reference surface 541, 543 in the depth image 320. In this case, the reference surface 541, 543 may include at least any one of the wall surface 541, bottom surface 543 or ceiling (not illustrated) of an indoor environment.

Figure 7A:
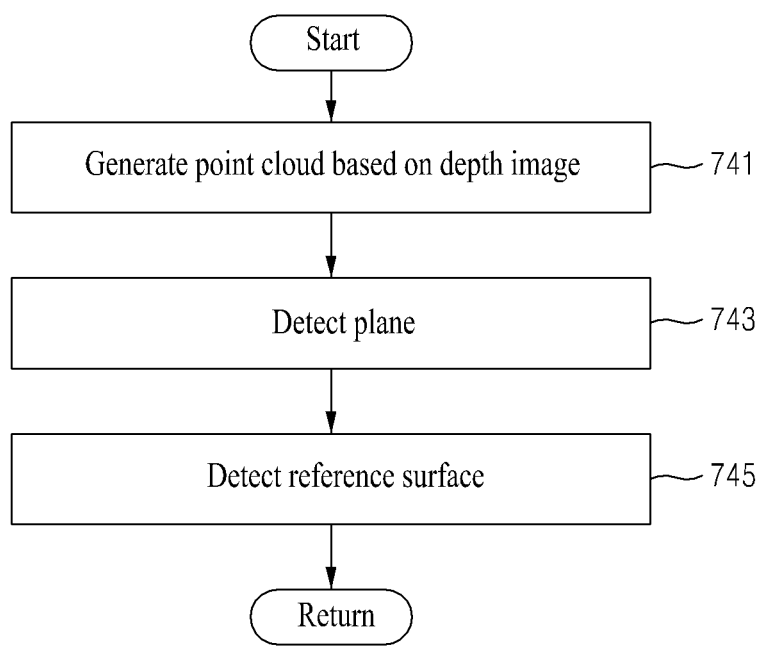
FIG. 7A is a diagram illustrating an example of an operation of detecting a reference surface in FIG. 6.

FIG. 7A is a diagram illustrating an example of the operation 640 of detecting the reference surface 541, 543 in FIG. 6.

Referring to FIG. 7A, at operation 741, the electronic device 100 may generate a point cloud based on the depth image 320. The processor 190 may generate the point cloud, configured with a plurality of points, by projecting the depth image 320 onto a 3D space. In this case, the processor 190 may individually generate the points using the depth values of the pixels of the depth image 320.

At operation 743, the electronic device 100 may detect at least one plane in the point cloud. The processor 190 may detect the plane by clustering the points of the point cloud. In this case, the processor 190 may cluster points based on the depth values of the points and a deployment relation of the points. According to one embodiment, the processor 190 may cluster the points using a hierarchical agglomerative clustering (HAC) algorithm. For example, the processor 190 may remove at least one error point attributable to electrical noise or diffused reflection of an infrared ray, for example, from points, and then may cluster points configuring one or more planes. Accordingly, the processor 190 may extract at least one cluster from the points and detect a plane using the extracted cluster.

At operation 745, the electronic device 100 may detect at least any one of the planes as the reference surface 541, 543. The processor 190 may detect at least any one of the planes as the reference surface 541, 543 based on at least any one of the shape or location of the plane. For example, if a plurality of planes is detected, the processor 190 may detect at least any one of the planes as the reference surface 541, 543 by comparing the shapes and the planes of the planes and the deployment relations of the planes. For example, the processor 190 may detect at least any two of planes as the reference surfaces 541 and 543, respectively, by combining at least any two of the planes so that an indoor environment is implemented. Thereafter, the electronic device 100 may return to the process of FIG. 6.

Figure 7B:
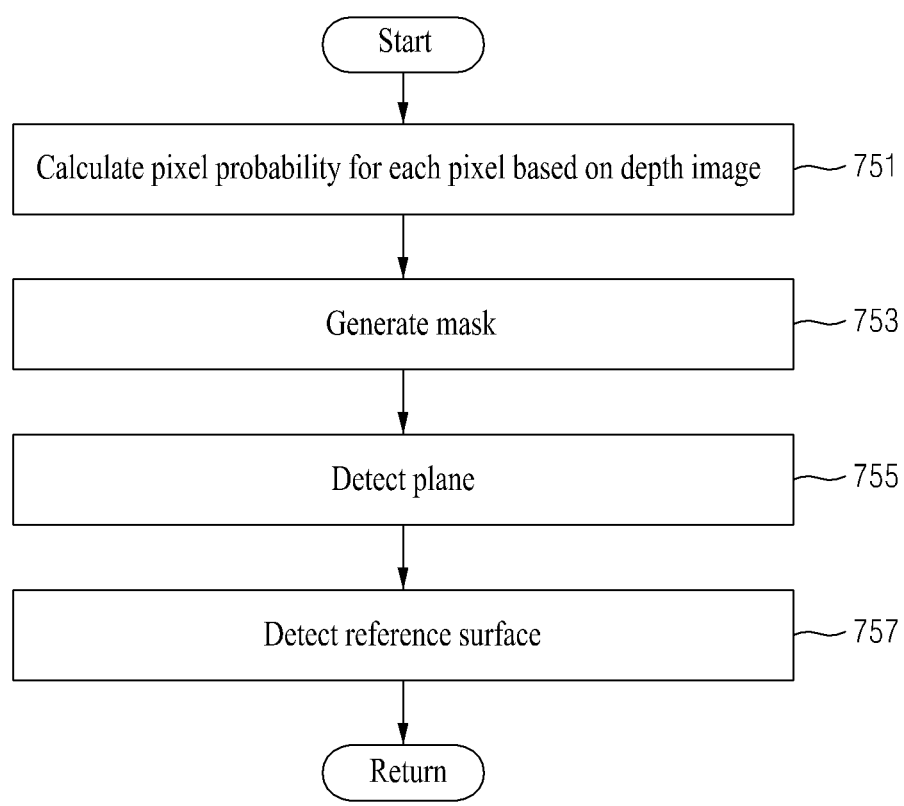
FIG. 7B is a diagram illustrating another example of an operation of detecting a reference surface in FIG. 6.

FIG. 7B is a diagram illustrating another example of the operation 640 of detecting the reference surface 541, 543 in FIG. 6.

Referring to FIG. 7B, at operation 751, the electronic device 100 may calculate a pixel probability for each pixel in the reference surface 541, 543 based on the depth image 320. In this case, the processor 190 may calculate the pixel probability for each pixel through a semantic segmentation deep learning scheme.

At operation 753, the electronic device 100 may generate at least one mask based on the pixel probability for each pixel. The processor 190 may compare the pixel probability with a predetermined threshold, and may generate the mask from the depth image 320 based on whether the pixel probability exceeds the threshold. Accordingly, the processor 190 may detect depth pixels from the depth image 320 through the mask.

For example, the processor 190 may calculate at least any one of a pixel probability in the wall surface 541, a pixel probability in the bottom surface 543 or a pixel probability in a ceiling (not illustrated) with respect to each pixel. The processor 190 may generate a wall surface mask based on the pixel probability in the wall surface 541. The processor 190 may generate a bottom surface mask based on the pixel probability in the bottom surface 543. The processor 190 may generate a ceiling mask based on the pixel probability the ceiling (not illustrated). In this case, if the pixel probability of a pixel is less than the threshold, the processor 190 may determine the corresponding pixel as a mask pixel. Accordingly, the processor 190 may generate at least any one of the wall surface mask, the bottom surface mask or the ceiling mask by performing masking processing on the mask pixel. Thereafter, the processor 190 may multiply the depth image 320 by at least any one of the wall surface mask, the bottom surface mask or the ceiling mask so that only depth pixels corresponding to the wall surface, the bottom surface or the ceiling remain.

At operation 755, the electronic device 100 may detect at least one plane in the depth image 320. The processor 190 may detect the plane based on depth pixels. In this case, a calculation time taken to detect the plane based on the depth pixels can be significantly reduced compared to a calculation time taken to detect a plane based on all the pixels of the depth image 320.

For example, the processor 190 may generate a point cloud configured with a plurality of depth points based on depth pixels. In this case, the processor 190 may individually generate the depth points based on depth values of the depth pixels. Furthermore, the processor 190 may detect at least one plane in the point cloud. The processor 190 may detect the plane by clustering the depth points of the point cloud. In this case, the processor 190 may cluster the depth points based on the deployment relation between the depth points and the depth values of the depth points. According to one embodiment, the processor 190 may cluster the depth points using a hierarchical agglomerative clustering (HAC) algorithm. For example, the processor 190 may remove at least one error point from the depth points, for example, electrical noise or diffused reflection of infrared rays, and may cluster the depth points configuring one or more planes. Accordingly, the processor 190 may extract at least one cluster from the depth points and detect the plane using the cluster.

At operation 757, the electronic device 100 may detect at least any one of the planes as the reference surface 541, 543. The processor 190 may detect at least any one of the planes as the reference surface 541, 543 based on at least any one of a shape or location of a plane. For example, if a plurality of planes is detected, the processor 190 may compare shapes of the planes and deployment relations between the planes, and may detect at least any one of the planes as the reference surface 541, 543. For example, the processor 190 may combine at least any two of the planes so that an indoor environment is implemented, and may detect at least any two of the planes as the reference surfaces 541 and 543, respectively. Thereafter, the electronic device 100 may return to FIG. 6.

Figure 5B:
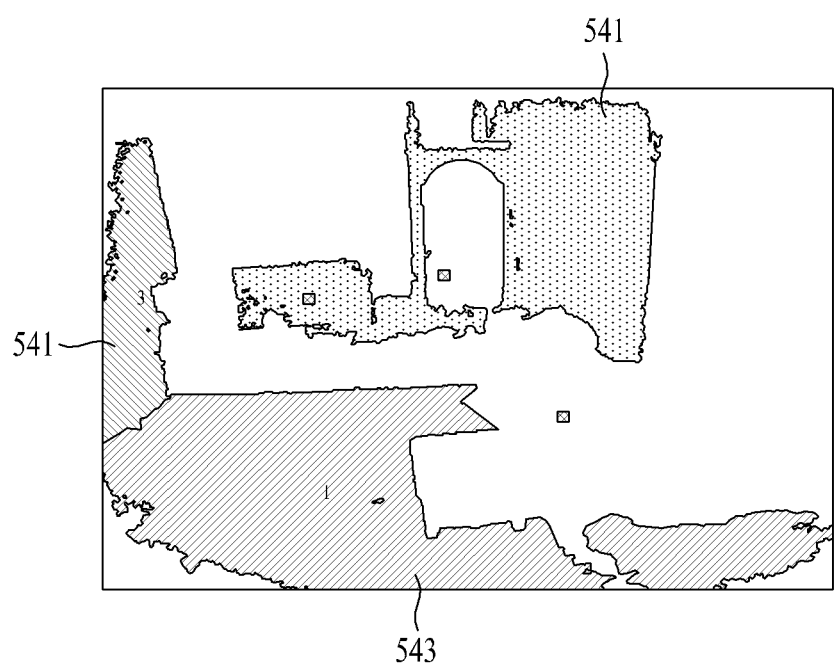
Figure 5C:
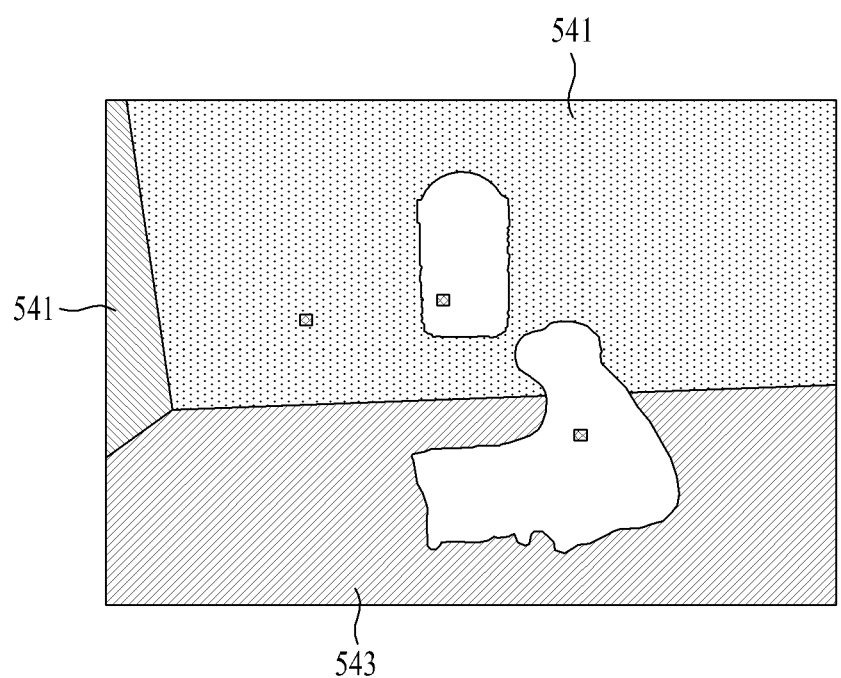

According to one embodiment, as shown in FIG. 5b, the processor 190 may cluster at least some of the reference surfaces 541 and 543 so that an indoor environment can be reconfigured through a relation between the detected reference surfaces 541 and 543. For example, two reference surfaces 543 may be clustered as a single bottom surface 543 because they have similar normal vectors. Two different reference surfaces 541 have different normal vectors and have a normal vector different from that of the bottom surface 543. Accordingly, the two different reference surfaces 541 are not clustered and may be determined as independent wall surfaces 541. Accordingly, as shown in FIG. 5c, the processor 190 may reconfigure an indoor environment using the reference surfaces 541 and 543.

Referring back to FIG. 6, at operation 650, the electronic device 100 may identify the reference depth of the reference surface 541, 543 based on the depth image 320. The processor 190 may identify the reference depth of the reference surface 541, 543 from the depth image 320. According to one embodiment, the processor 190 may extract depth values of pixels, corresponding to the reference surface 541, 543, from the depth image 320, and may calculate an intermediate value of the depth values as a representative reference depth for each of the reference surfaces 541 and 543.

At operation 660, the electronic device 100 may compare an interested depth with a reference depth, and may process the interested area 431, 433, 435. The processor 190 may identify each of the interested areas 431, 433, and 435 as any one of the actual object area 431 or the object false image area 433, 435 by comparing the interested depth with the reference depth, and may perform corresponding processing. In this case, the processor 190 may identify each of the object false image area 433, 435 as any one of the reflection object area 433 or the display object area 435. For example, the processor 190 may neglect the object false image area 433, 435, and may execute a predetermined function in accordance with the actual object area 431.

If the interested area 433 is positioned outside a reconfigured indoor environment (positioned at a location farther than a reference depth), the interested area 433 may be a reflection object area 433. If the interested area 435 is positioned above a reconfigured indoor environment (positioned at the same location as the reference depth), the interested area 435 may be a display object area 435. If the interested area 431 is positioned inside an indoor environment, the interested area 433 may be an actual object area 431.

Figure 5D:
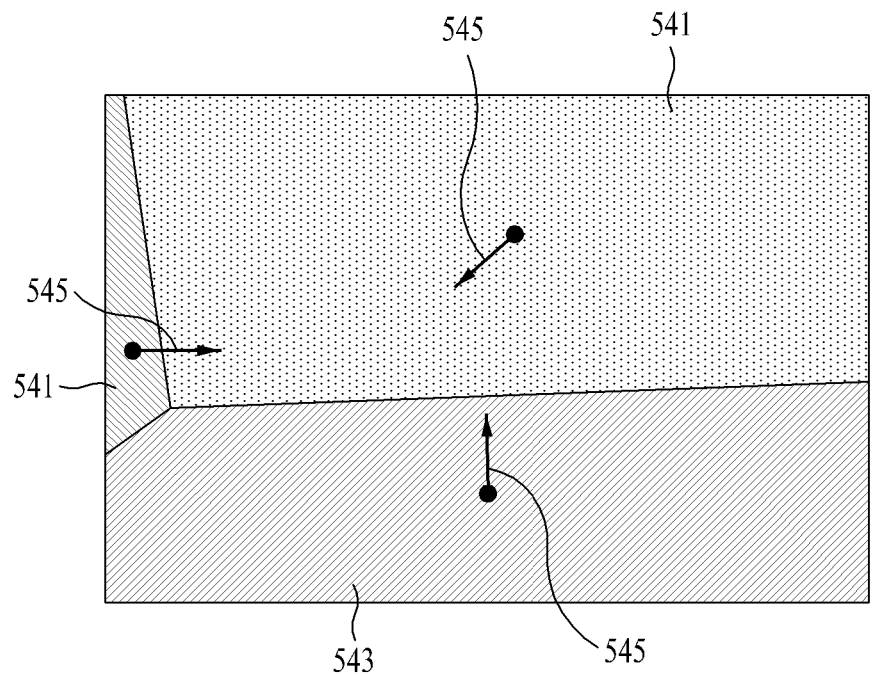

According to one embodiment, whether the interested area 431, 433, 435 is positioned outside, above or inside a reconfigured indoor environment may be determined from the plane equation of the reference surface 541, 543 of the reconfigured indoor environment on a space. As shown in FIG. 5d, the normal vectors 545 of all the reference surfaces 541 and 543 may be configured toward the camera module 160. For example, in a space coordinate system having the camera module 160 as the origin, an area in which all the signs of three plane equations are positive numbers may be an area corresponding to the inside of an indoor environment. In this case, plane equations for n(subscript) reference surfaces 541, 543 of a reconfigured indoor environment may be represented by Equation 1 below.

$$p_1(x) = n_1^T \cdot (x - c_1) = 0$$

...

$$p_n(x) = n_n^T \cdot (x - c_n) = 0 \quad \text{[Equation 1]}$$

In this case, in all the plane equations, n may indicate the normal vector 545 of each of the reference surfaces 541 and 543. c may indicate the center point of the reference surface 541, 543.

If the normal vector is always set toward the camera module 160, when the coordinates of an object is $h_i$ (e.g., $h_i = [X_i, Y_i, Z_i]^T$), the following condition may be generated.

If the object is placed between the reference surface 541, 543 and the camera module 160 (i.e., actual object), $p_n(h_i) > 0$ for all the plane equations.

If the object is positioned out of the reference surface 541, 543 (i.e., reflected false image), $p_i(x) < 0$ for a plane equation where a mirror is placed.

If the object is placed over the reference surface 541, 543 (i.e., displayed false image), $p_i(x) = 0$ for a plane equation where a display is placed.

Figure 8:
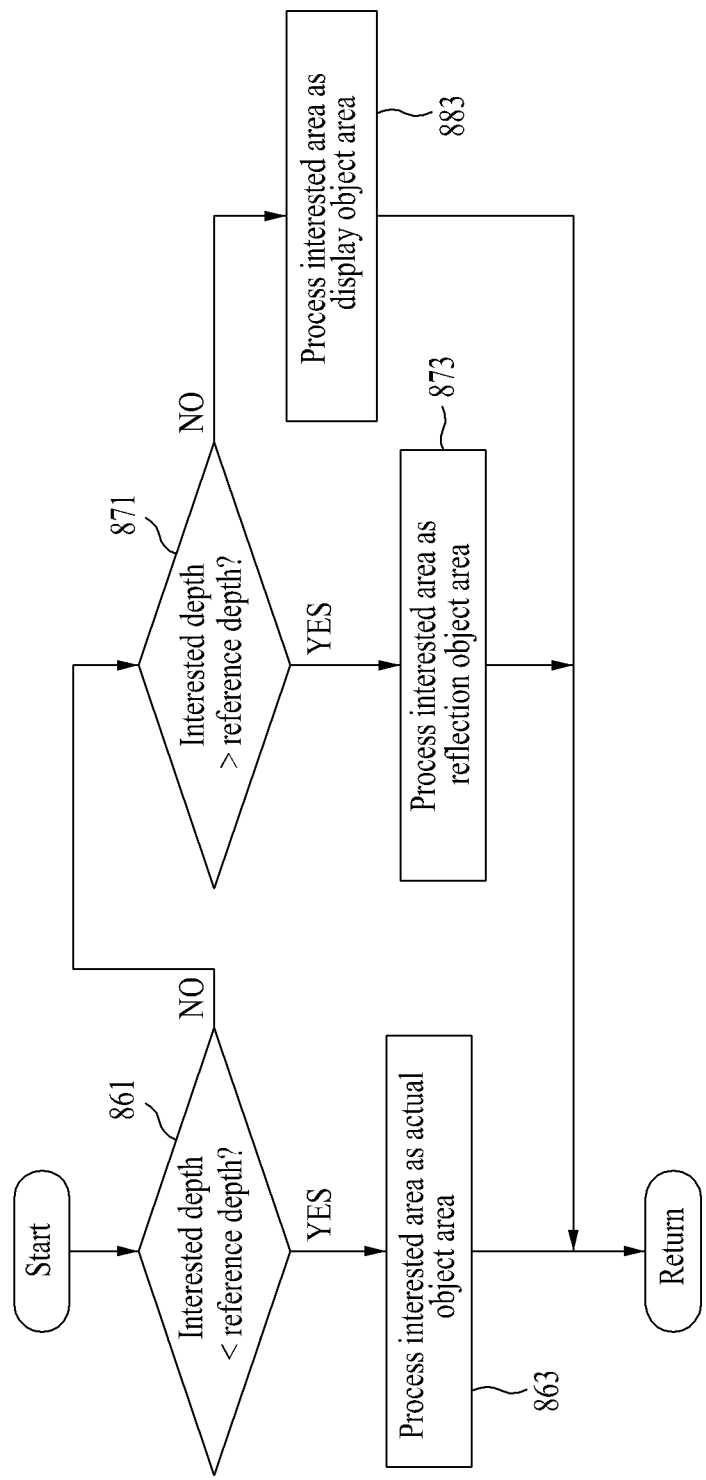
FIG. 8 is a diagram illustrating an operation of processing a human body area of FIG. 6.

FIG. 8 is a diagram illustrating the operation 660 of processing the interested area 431, 433, 435 of FIG. 6.

Referring to FIG. 8, at operation 861, the electronic device 100 may determine whether each of the interested areas 431, 433, and 435 is present in front of the reference surface 541, 543 with respect to the electronic device 100. In other words, the electronic device 100 may determine whether each of the interested areas 431, 433, and 435 is positioned between the electronic device 100 and the reference surface 541, 543. To this end, the processor 190 may determine whether an interested depth is less than a reference depth.

If it is determined that the interested area 431, 433, 435 is present in front of the reference surface 541, 543 at operation 861, the electronic device 100 may process the interested area 431, 433, 435 as the actual object area 431 at operation 863. That is, if it is determined that the interested depth is less than the reference depth, the processor 190 may determine that the interested area 431, 433, 435 is present in front of the reference surface 541, 543, and may determine the interested area 431, 433, 435 to be the actual object area 431. For example, the processor 190 may determine that an actual object is present in the actual object area 431 and execute a predetermined function on the actual object.

If it is determined that the interested area 431, 433, 435 is not present in front of the reference surface 541, 543 at operation 861, the electronic device 100 may determine whether the interested area 431, 433, 435 is present at the back of the reference surface 541, 543 at operation 871. In other words, the electronic device 100 may determine whether the reference surface 541, 533 is positioned between the electronic device 100 and the interested area 431, 433, 435. To this end, the processor 190 may determine whether the interested depth exceeds the reference depth. That is, if it is determined that the interested depth is not less than the reference depth, the processor 190 may determine whether the interested depth exceeds the reference depth.

If it is determined that the interested area 431, 433, 435 is present at the back of the reference surface 541, 543 at operation 871, the electronic device 100 may process the interested area 431, 433, 435 as the reflection object area 433 at operation 873. That is, if it is determined that the interested depth exceeds the reference depth, the processor 190 may determine that the interested area 431, 433, 435 is present at the back of the reference surface 541, 543, and may determine the interested area 431, 433, 435 to be the reflection object area 433. For example, the processor 190 may determine that an actual object is not present in the reflection object area 433, and may neglect the reflection object area 433.

If it is determined that the interested area 431, 433, 435 is not present at the back of the reference surface 541, 543 at operation 871, the electronic device 100 may process the interested area 431, 433, 435 as the display object area 435 at operation 883. That is, if it is determined that the interested depth is not less than the reference depth and does not exceed the reference depth, the processor 190 may determine that the interested depth is identical with the reference depth, and may determine the interested area 431, 433, 435 to be the display object area 435 present above the reference surface 541, 543. For example, the processor 190 may determine that an actual object is not present in the display object area 435, and may neglect the display object area 435.

An operating method of the electronic device 100 according to various embodiments may include obtaining the color image 310 and the depth image 320, detecting the interested area 431, 433, 435 indicative of at least one object in the color image 310, detecting the at least one reference surface 541, 543 in the depth image 320, and comparing an interested depth of the interested area 431, 433, 435, detected based on the depth image 320 with a reference depth of a reference surface and processing the interested area 431, 433, 435.

According to various embodiments, the processing of the interested area 431, 433, 435 may include at least any one of determining that the interested area 431 includes an actual object if the interested depth is less than the reference depth or determining that the interested area 433, 435 includes a false image in which an object is reflected if the interested depth is the reference depth or more.

According to various embodiments, the determining of a false image may include determining that the interested area 433 includes a false image in which an object is reflected by a mirror if the interested depth exceeds the reference depth and determining that the interested area 435 includes a false image in which an object is displayed on the reference surface 541, 543 if the interested depth is the same as a reference depth.

According to various embodiments, the object may include the human body.

According to various embodiments, the processing of the interested area 431, 433, 435 may further include neglecting the interested area 433, 435 if it is determined that the interested area 433, 435 includes a false image.

According to various embodiments, the reference surface 541, 543 may include at least any one of the wall surface 541, bottom surface 543 or ceiling (not illustrated) of an indoor environment.

According to one embodiment, the detecting of the reference surface 541, 543 may include generating a point cloud by projecting the depth image 320 onto a 3D space, detecting at least one plane by clustering the points of the point cloud, and detecting the reference surface 541, 543 in the plane.

According to another embodiment, the detecting of the reference surface 541, 543 may include calculating a pixel probability for each pixel from the depth image 320, generating a mask based on the pixel probability, detecting at least one plane in depth pixels detected by multiplying the depth image 320 by the mask, and detecting the reference surface 541, 543 in the plane.

According to various embodiments, the operating method of the electronic device 100 may further include identifying an interested depth of the interested area 431, 433, 435 by mapping the interested area 431, 433, 435 to the depth image 320 and identifying the reference depth of the reference surface 541, 543 in the depth image 320.

According to various embodiments, the identifying of the interested depth may include calculating an intermediate value of depth values of pixels, corresponding to the interested area 431, 433, 435, as the interested depth.

According to various embodiments, the identifying of the reference depth may include calculating an intermediate value of depth values of pixels, corresponding to the reference surface 541, 543, as the reference depth.

According to various embodiments, the electronic device 100 may detect an object based on a 3D image. That is, the electronic device may detect an object, for example, the human body using the depth image 320 in addition to the color image 310. Accordingly, the electronic device 100 can clearly identify an actual object and a false image attributable to reflection in an image. Accordingly, an operational error which occurs because a false image attributable to reflection is detected as an actual object in the electronic device 100 can be prevented.

The electronic device according to various embodiments disclosed in this document may be various types of devices. The electronic device may include a portable communication device (e.g., smartphone), a computer device, a portable multimedia device, a portable medical device, a camera, a wearable device, a robot or home appliances, for example. The electronic device according to various embodiments of this document is not limited to the aforementioned devices.

The embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A or/and B", "A, B or C" or "at least one of A, B and/or C", may include all of possible combinations of listed items together. Expressions, such as "a first," "a second," "the first" and "the second", may modify corresponding elements regardless of the sequence and/or importance, and are used to only distinguish one element from the other element and do not limit corresponding elements. When it is described that one (e.g., first) element is "(operatively or communicatively) connected to" or "coupled with" the other (e.g., second) element, one element may be directly connected to the other element or may be connected to the other element through another element (e.g., third element).

The "module" used in this document includes a unit configured with hardware, software or firmware, and may be interchangeably used with a term, such as logic, a logical block, a part or a circuit. The module may be an integrated part, a minimum unit to perform one or more functions, or a part thereof. For example, the module may be configured with an application-specific integrated circuit (ASIC).

Various embodiments of this document may be implemented in the form of software including one or more instructions stored in a storage medium (e.g., the memory 180) readable by a machine (e.g., the electronic device 100). For example, the processor (e.g., the processor 190) of the machine may fetch at least one of one or more stored instructions from a storage medium, and may execute the one or more instructions. This enables the machine to perform at least one function based on the fetched at least one instruction. The one or more instructions may include code generated by a complier or code executable by an interpreter. The storage medium readable by the machine may be provided in the form of a non-transitory storage medium. In this case, "non-transitory" means that a storage medium is a tangible device and does not include a signal (e.g., electromagnetic waves). The term is not used regardless of whether data is semi-persistently stored in a storage medium and whether data is temporally stored in a storage medium.

A non-transitory storage computer-readable storage medium according to various embodiments may be for storing one or more programs for executing an operation of obtaining the color image 310 and the depth image 320, an operation of detecting the interested area 431, 433, 435 indicative of at least one object in the color image 310, an operation of detecting the at least one reference surface 541, 543 in the depth image 320, and an operation of comparing an interested depth of the interested area 431, 433, 435, detected based on the depth image 320, with the reference depth of the reference surface and performing processing on the interested area 431, 433, 435.

According to various embodiments, the object may include the human body.

According to various embodiments, the electronic device can detect an object based on a 3D image. That is, the electronic device can detect an object, for example, the human body using a depth image in addition to a color image. Accordingly, the electronic device can clearly identify an actual object and a false image attributable to reflection in an image. Accordingly, an operational error which occurs because a false image attributable to reflection is detected as an actual object in the electronic device can be prevented.

According to various embodiments, each (e.g., module or program) of the described elements may include a single entity or a plurality of entities. According to various embodiments, one or more of the above-described elements or operations may be omitted or one or more other elements or operations may be added. Alternatively or additionally, a plurality of elements (e.g., modules or programs) may be integrated into one element. In such a case, the integrated elements may perform one or more functions of each of a plurality of elements identically with or similar to that performed by a corresponding one of the plurality of elements before the elements are integrated. According to various embodiments, module, operations performed by a program or other elements may be executed sequentially, in parallel, repeatedly, or heuristically, or one or more of the operations may be executed in different order or may be omitted, or one or more other operations may be added.

What is claimed is:

1. An operating method of an electronic device, comprising:
    obtaining a color image and a depth image;
    detecting an interested area indicative of at least one object in the color image;
    detecting at least one reference surface in the depth image; and
    comparing an interested depth of the interested area, detected based on the depth image, with a reference depth of the reference surface and processing the interested area,
    wherein the processing of the interested area comprises at least any one of:
        determining that the interested area comprises an actual object if the interested depth is less than the reference depth, or
        determining that the interested area comprises a false image in which the object is reflected if the interested depth is the reference depth or more, and
    wherein the determining of the false image comprises:
        determining that the interested area comprises a false image in which the object is reflected by a mirror if the interested depth exceeds the reference depth, and
        determining that the interested area comprises a false image in which the object is displayed on the reference surface if the interested depth is identical with the reference depth.

2. The operating method of claim 1, wherein the processing of the interested area further comprises neglecting the interested area if the interested area is determined to comprise the false image.

3. The operating method of claim 1, wherein the reference surface comprises at least any one of a wall surface, bottom surface or ceiling of an indoor environment.

4. The operating method of claim 3, wherein the detecting of the reference surface comprises:
    generating a point cloud by projecting the depth image onto a three-dimensional (3D) space;
    detecting at least one plane by clustering points of the point cloud; and
    detecting the reference surface in the plane.

5. The operating method of claim 3, the detecting of the reference surface comprises:
    calculating a pixel probability for each pixel from the depth image;
    generating a mask based on the pixel probability;
    detecting at least one plane in depth pixels detected by multiplying the depth image by the mask; and
    detecting the reference surface in the plane.

6. The operating method of claim 1, further comprising:
    identifying the interested depth of the interested area by mapping the interested area to the depth image; and
    identifying the reference depth of the reference surface in the depth image.

7. The operating method of claim 6,
    wherein the identifying of the interested depth comprises calculating an intermediate value of depth values of pixels, corresponding to the interested area, as the interested depth, and wherein the identifying of the reference depth comprises calculating an intermediate value of depth values of pixels, corresponding to the reference surface, as the reference depth.

8. An electronic device comprising:
    a camera module; and
    a processor connected to the camera module and configured to obtain a color image and a depth image through the camera module,
    wherein the processor is configured to:
    obtain a color image and a depth image;
    detect an interested area indicative of at least one object in the color image;
    detect at least one reference surface in the depth image; and
    compare an interested depth of the interested area, detected based on the depth image, with a reference depth of the reference surface and process the interested area,
    wherein the processor is configured to:
        determine that the interested area comprises an actual object if the interested depth is less than the reference depth,
        determine that the interested area comprises a false image in which the object is reflected if the interested depth is the reference depth or more, and
        neglect the interested area if it is determined that the interested area includes the false image; and
    wherein the processor is configured to:
        determine that the interested area comprises a false image in which the object is reflected by a mirror if the interested depth exceeds the reference depth, and
        determine that the interested area comprises a false image in which the object is displayed on the reference surface if the interested depth is identical with the reference depth.

9. The electronic device of claim 8, wherein the reference surface comprises at least any one of a wall surface, bottom surface or ceiling of an indoor environment.

10. The electronic device of claim 9, wherein the processor is configured to:
  generate a point cloud by projecting the depth image onto a three-dimensional (3D) space;
  detect at least one plane by clustering points of the point cloud; and
  detect the reference surface in the plane.

11. The electronic device of claim 9, wherein the process is configured to:
  calculate a pixel probability for each pixel from the depth image,
  generate a mask based on the pixel probability,
  detect at least one plane in depth pixels detected by multiplying the depth image by the mask, and
  detect the reference surface in the plane.

12. The electronic device of claim 8, wherein the processor is configured to:
  identify the interested depth of the interested area by mapping the interested area to the depth image; and
  identify the reference depth of the reference surface in the depth image.

13. The electronic device of claim 12, wherein the processor is configured to:
  calculate an intermediate value of depth values of pixels, corresponding to the interested area, as the interested depth, and
  calculate an intermediate value of depth values of pixels, corresponding to the reference surface, as the reference depth.

14. The electronic device of claim 8, wherein the camera module comprises:
  a first camera module configured to capture the color image; and
  a second camera module configured to capture the depth image.

15. The electronic device of claim 8, wherein:
  the camera module comprises a plurality of color pixels and a plurality of infrared pixels,
  the color image is generated through the color pixels, and
  the depth image is generated through the infrared pixels.

16. A non-transitory computer-readable storage medium for storing one or more programs for:
  obtaining a color image and a depth image;
  detecting an interested area indicative of at least one object in the color image;
  detecting at least one reference surface in the depth image; and
  comparing an interested depth of the interested area, detected based on the depth image, with a reference depth of the reference surface and processing the interested area,
  wherein the processing of the interested area comprises at least any one of:
    determining that the interested area comprises an actual object if the interested depth is less than the reference depth, or,
    determining that the interested area comprises a false image in which the object is reflected if the interested depth is the reference depth or more, and
  wherein the determining of the false image comprises:
    determining that the interested area comprises a false image in which the object is reflected by a mirror if the interested depth exceeds the reference depth, and
    determining that the interested area comprises a false image in which the object is displayed on the reference surface if the interested depth is identical with the reference depth.

* * * * *